United States Patent
Hamajima et al.

(10) Patent No.: US 11,041,542 B2
(45) Date of Patent: Jun. 22, 2021

(54) POWER TRANSMISSION MECHANISM

(71) Applicant: TOYOTA JIDOSHA KABUSHIKI KAISHA, Toyota (JP)

(72) Inventors: Tetsuo Hamajima, Nisshin (JP); Tadashi Takagaki, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 271 days.

(21) Appl. No.: 16/158,632

(22) Filed: Oct. 12, 2018

(65) Prior Publication Data

US 2019/0128377 A1    May 2, 2019

(30) Foreign Application Priority Data

Oct. 30, 2017 (JP) .............................. JP2017-209352

(51) Int. Cl.
*F16H 1/08*       (2006.01)
*F16H 57/00*     (2012.01)
*F16H 1/20*       (2006.01)
*F16H 57/02*     (2012.01)
*F16H 57/021*   (2012.01)

(52) U.S. Cl.
CPC ................ *F16H 1/08* (2013.01); *F16H 1/20* (2013.01); *F16H 57/0006* (2013.01); *F16H 57/0018* (2013.01); *F16H 57/021* (2013.01); *F16H 2057/02043* (2013.01)

(58) Field of Classification Search
CPC ............. F16H 1/08; F16H 1/20; F16H 57/006
USPC .................................................... 74/443, 458
See application file for complete search history.

(56) References Cited

U.S. PATENT DOCUMENTS

| 4,188,821 | A | * | 2/1980 | Elias | G01L 3/108 |
| | | | | | 73/862.31 |
| 8,720,306 | B2 | * | 5/2014 | McCune | F16H 57/0006 |
| | | | | | 74/665 GD |
| 2016/0369882 | A1 | * | 12/2016 | Meffert | F16H 55/17 |

FOREIGN PATENT DOCUMENTS

| CN | 104081025 A | | 10/2014 |
| DE | 10 2014 2232 771 | * | 5/2016 |
| JP | 2014-084904 A | | 5/2014 |
| JP | 2016-056888 A | | 4/2016 |
| JP | 2018-087619 A | | 6/2018 |
| WO | 2013/158179 A2 | | 10/2013 |

* cited by examiner

Primary Examiner — William C Joyce
(74) Attorney, Agent, or Firm — Oliff PLC

(57) ABSTRACT

A power transmission mechanism equipped with a first shaft including a first double helical gear, a second shaft including a second double helical gear and a third double helical gear arranged in alignment with the second double helical gear in an axial direction, and a third shaft including a fourth double helical gear that meshes with the third double helical gear. The second double helical gear includes a pair of right and left tooth portions whose torsional directions are reverse to each other such that the left tooth portion and the right tooth portion are offset in phase from each other, and the third double helical gear includes a pair of right and left tooth portions whose torsional directions are reverse to each other such that the left tooth portion and the right tooth portion are identical in phase to each other.

2 Claims, 2 Drawing Sheets

LEFT SIDE ←—— AXIAL DIRECTION ——→ RIGHT SIDE

LEFT SIDE ←——— AXIAL DIRECTION ———→ RIGHT SIDE

POWER TRANSMISSION MECHANISM

CROSS-REFERENCE TO RELATED APPLICATIONS

This application claims priority to Japanese Patent Application No. 2017-209352 filed on Oct. 30, 2017, which is incorporated herein by reference in its entirety.

BACKGROUND

1. Technical Field

The disclosure relates to a power transmission mechanism.

2. Description of Related Art

In Japanese Patent Application Publication No. 2016-56888 (JP 2016-56888 A), there is disclosed a power transmission mechanism in which a final gear pair made up of a pair of a final drive gear and a final driven gear (a differential ring gear) that mesh with each other is configured to be a gear pair made up of a pair of double helical gears that mesh with each other, as a power transmission mechanism that is mounted in a vehicle.

SUMMARY

In the gear pair made up of the double helical gears that mesh with each other, when the double helical gears have an error component (a meshing error), an axial force is produced at a meshing portion due to one-sided contact between the double helical gears. The double helical gears move in an axial direction due to this axial force, so an aligning action for establishing double-sided contact between the double helical gears is effective at the meshing portion. Thus, the level of vibrations and noise can be made lower in the double helical gears than in spur gears.

However, in the case where a plurality of double helical gears are provided on a single rotary shaft, axial forces are produced at a plurality of meshing portions respectively. Therefore, the aligning actions of the plurality of the double helical gears are hindered by one another due to the mutual interference of the axial behaviors of the double helical gears on the same shaft. As a result, a deterioration may occur in terms of vibrations and noise.

The disclosure has been made in view of the above circumstances. The disclosure provides a power transmission mechanism that can restrain a deterioration from occurring in terms of vibrations and noise as a result of the mutual interference of axial behaviors of a plurality of double helical gears in the case where the plurality of the double helical gears are provided on the same shaft.

Thus, according to one aspect of the disclosure, there is provided a power transmission mechanism that is equipped with a first shaft, a second shaft and a third shaft. The first shaft includes a first double helical gear. The second shaft includes a second double helical gear that meshes with the first double helical gear, and a third double helical gear that is arranged in alignment with the second double helical gear in an axial direction. The third shaft includes a fourth double helical gear that meshes with the third double helical gear. In the power transmission mechanism, the second double helical gear includes a pair of tooth portions whose torsional directions are reverse to each other, and one of the tooth portions and the other tooth portion are offset in phase from each other. The third double helical gear includes a pair of tooth portions whose torsional directions are reverse to each other, and one of the tooth portions and the other tooth portion are identical in phase to each other.

Besides, in the power transmission mechanism, a diameter of the third double helical gear may be smaller than a diameter of the second double helical gear. Besides, an axial force which the third double helical gear produces may be larger than an axial force which the second double helical gear produces.

According to the configuration of the power transmission mechanism as described above, the establishment of double-sided contact is made easy by making the tooth portions of the small-diameter double helical gear to which the larger axial force is applied identical in phase to each other, and the axial forces are produced in opposite directions and counterbalanced by each other. Therefore, the axial behavior of the third double helical gear can be suppressed.

Besides, in the power transmission mechanism, one of the tooth portions of the second double helical gear may be half offset in phase from the other tooth portion thereof.

According to the configuration of the power transmission mechanism as described above, one of the tooth portions of the second double helical gear and the other tooth portion thereof are half offset in phase from each other, so a meshing compelling force that is produced at a meshing portion of the second double helical gear and the first double helical gear is more scattered.

In the power transmission mechanism as described above, as for the two double helical gears provided on the second shaft, the second double helical gear is a gear including tooth portions that are different in phase from each other, and the third double helical gear is a gear including tooth portions that are identical in phase to each other. In the third double helical gear whose tooth portions are identical in phase to each other, axial forces that are produced at the meshing portion are counterbalanced by each other to suppress an axial behavior, so the third double helical gear can be restrained from hindering the aligning action of the second double helical gear. Thus, in the case where the plurality of the double helical gears are provided on the same rotary shaft, the aligning actions of the plurality of the double helical gears can be restrained from being hindered by one another due to the mutual interference of the axial behaviors of the respective double helical gears. As a result, a deterioration can be restrained from occurring in terms of vibrations and noise.

BRIEF DESCRIPTION OF THE DRAWINGS

Features, advantages, and technical and industrial significance of an exemplary embodiment of the disclosure will be described below with reference to the accompanying drawings, in which like numerals denote like elements, and wherein.

DETAILED DESCRIPTION OF EMBODIMENT

The power transmission mechanism according to the embodiment of the disclosure will be concretely described hereinafter with reference to the drawings.

Figure 1:
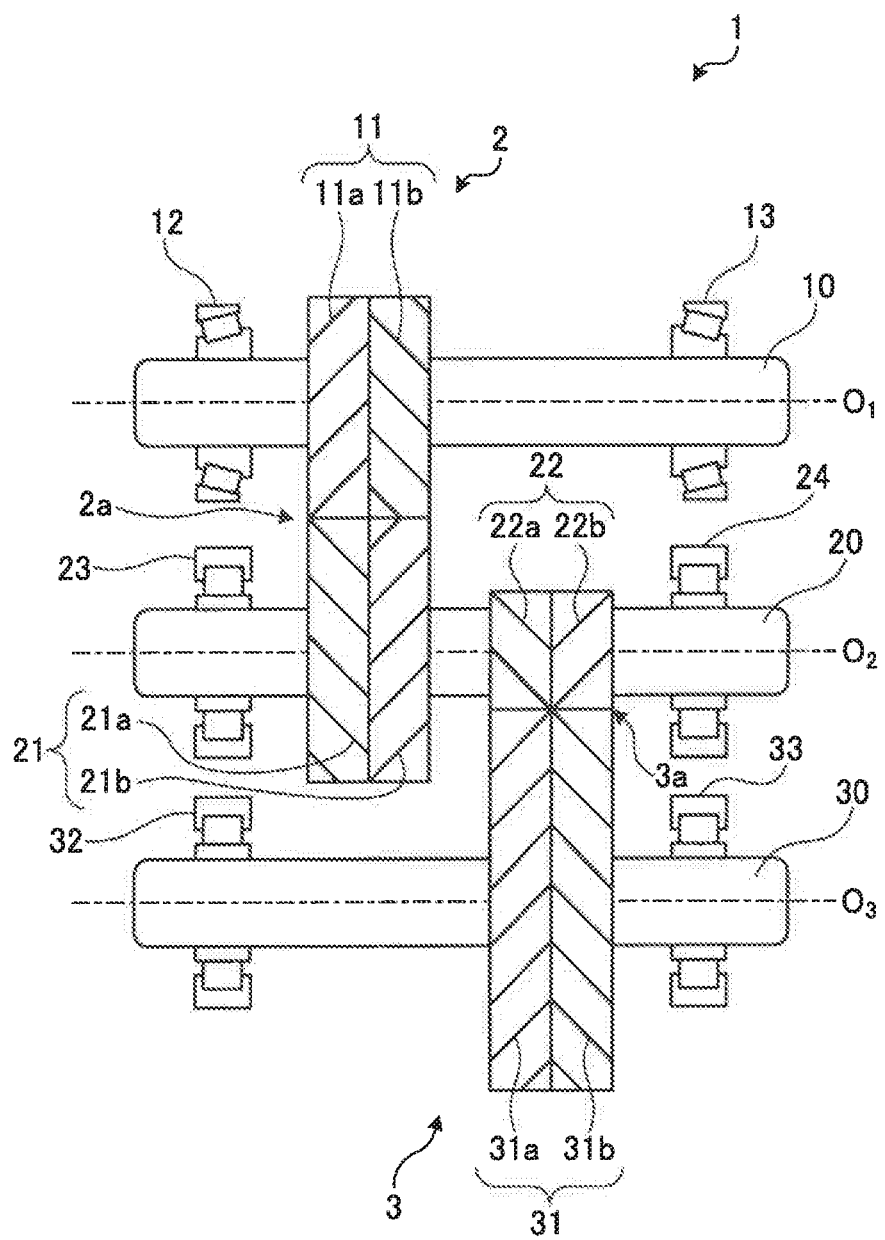
FIG. 1 is a view schematically showing a power transmission mechanism according to the embodiment of the disclosure.

FIG. 1 is a view schematically showing a power transmission mechanism 1 according to the embodiment of the disclosure. The power transmission mechanism 1 is equipped with a first shaft 10, a second shaft 20 and a third shaft 30 as three rotary shafts arranged parallel to one another. Each of the first shaft 10 and the third shaft 30 is a rotary shaft including a single double helical gear (a gear shaft that meshes with a single double helical gear provided on another shaft). On the other hand, the second shaft 20 as an intermediate shaft is a rotary shaft including a plurality of double helical gears (a gear shaft that meshes with a plurality of double helical gears provided on another shaft). Furthermore, out of the plurality of the double helical gears provided on the second shaft 20, one of the double helical gears constitutes a gear pair made up of double helical gears meshing with each other and each including tooth portions that are different in phase from each other, and the other double helical gear constitutes a gear pair made up of double helical gears meshing with each other and each including tooth portions that are identical in phase to each other.

More specifically, the power transmission mechanism 1 is equipped with the first shaft 10 including a first double helical gear 11, the second shaft 20 including a second double helical gear 21 that meshes with the first double helical gear 11, and the third shaft 30 including a third double helical gear 22 that is provided on the second shaft 20 in alignment with the second double helical gear 21 in an axial direction, and a fourth double helical gear 31 that meshes with the third double helical gear 22. The first shaft 10 and the second shaft 20 are coupled to each other in such a manner as to enable the transmission of motive power by a first gear pair 2. The first gear pair 2 is constituted of the first double helical gear 11 and the second double helical gear 21, and is a gear pair made up of double helical gears meshing with each other and each including tooth portions that are different in phase from each other. The second shaft 20 and the third shaft 30 are coupled to each other in such a manner as to enable the transmission of motive power by a second gear pair 3. The second gear pair 3 is constituted of the third double helical gear 22 and the fourth double helical gear 31, and is a gear pair made up of double helical gears meshing with each other and each including tooth portions that are identical in phase to each other. Also, a motive power of the first shaft 10 is transmitted to the third shaft 30 from the first shaft 10 via the second shaft 20. Incidentally, in this description, one side in the axial direction is mentioned as the right side shown in FIG. 1, whereas the other side in the axial direction is mentioned as the left side shown in FIG. 1, as to arrangement in the axial direction.

The first double helical gear 11 has a left tooth portion 11a and a right tooth portion 11b as a pair of tooth portions whose torsional directions are reverse to each other, and the left tooth portion 11a and the right tooth portion 11b are offset in phase from each other. This phase represents a position in a circumferential direction around a central axis of rotation $O_1$ of the first shaft 10 and the first double helical gear 11. For example, the left tooth portion 11a is half offset in phase from the right tooth portion 11b. Besides, the first double helical gear 11 is integrated with the first shaft 10 relatively immovably in the axial direction and rotates integrally with the first shaft 10.

The second double helical gear 21 has a left tooth portion 21a and a right tooth portion 21b as a pair of tooth portions whose torsional directions are reverse to each other, and the left tooth portion 21a and the right tooth portion 21b are offset in phase from each other. This phase represents a position in a circumferential direction around a central axis of rotation $O_2$ of the second shaft 20 and the second double helical gear 21. For example, the left tooth portion 21a is half offset in phase from the right tooth portion 21b. Besides, the second double helical gear 21 is integrated with the second shaft 20 relatively immovably in the axial direction and rotates integrally with the second shaft 20.

Also, at a meshing portion 2a of the first gear pair 2, the left tooth portion 11a of the first double helical gear 11 and the left tooth portion 21a of the second double helical gear 21 mesh with each other, and the right tooth portion 11b of the first double helical gear 11 and the right tooth portion 21b of the second double helical gear 21 mesh with each other. In this first gear pair 2, the first double helical gear 11 and the second double helical gear 21, whose tooth portions are each different in phase from each other, mesh with each other, so the meshing of the left tooth portions 11a and 21a and the meshing of the right tooth portions 11b and 21b alternate with each other. Thus, a meshing compelling force that is produced at the meshing portion 2a is scattered, and a meshing first-order component that is produced in the first gear pair 2 is reduced. As a result, the level of vibrations and noise at the meshing portion 2a can be reduced. Incidentally, at the meshing portion 2a, a slight axial behavior occurs in the second double helical gear 21 but does not constitute a factor in the occurrence of vibrations and noise.

The third double helical gear 22 has a left tooth portion 22a and a right tooth portion 22b as a pair of tooth portions whose torsional directions are reverse to each other, and the left tooth portion 22a and the right tooth portion 22b are identical in phase to each other. This phase represents a position in the circumferential direction around the central axis of rotation $O_2$ of the second shaft 20 and the third double helical gear 22. Besides, the third double helical gear 22 is integrated with the second shaft 20 relatively immovably in the axial direction and rotates integrally with the second shaft 20. Furthermore, the third double helical gear 22 is smaller in diameter than the second double helical gear 21.

The fourth double helical gear 31 has a left tooth portion 31a and a right tooth portion 31b as a pair of tooth portions whose torsional directions are reverse to each other, and the left tooth portion 31a and the right tooth portion 31b are identical in phase to each other. The phase of the left tooth portion 31a and the right tooth portion 31b represents a position in the circumferential direction around a central axis of rotation $O_3$ of the third shaft 30 and the fourth double helical gear 31. Besides, the fourth double helical gear 31 is integrated with the third shaft 30 relatively immovably in the axial direction and rotates integrally with the third shaft 30. Furthermore, the fourth double helical gear 31 is larger in diameter than the third double helical gear 22. That is, the second gear pair 3 is a reduction gear pair.

At a meshing portion 3a of the second gear pair 3, the left tooth portion 22a of the third double helical gear 22 and the left tooth portion 31a of the fourth double helical gear 31 mesh with each other, and the right tooth portion 22b of the third double helical gear 22 and the right tooth portion 31b of the fourth double helical gear 31 mesh with each other. In this second gear pair 3, the third double helical gear 22 and the fourth double helical gear 31, whose tooth portions are each identical in phase to each other, so the meshing of the left tooth portions 22a and 31a and the meshing of the right tooth portions 22b and 31b occur simultaneously with each other.

Furthermore, in the second gear pair 3, the right and left tooth portions 22b and 22a of the third double helical gear 22 and the right and left tooth portions 31*b* and 31*a* of the fourth double helical gear 31 may be in one-sided contact with each other respectively due to an error component (a meshing error) of the meshing portion 3*a* at the time of the start of rotation or the like. For example, when the right tooth portion 22*b* and the right tooth portion 31*b* are out of contact with each other although the left tooth portion 22*a* and the left tooth portion 31*a* are in contact with each other, there is produced an axial force (hereinafter referred to as a thrust force) that is applied to the meshing portion 3*a* leftward in the axial direction. When the third double helical gear 22 and the fourth double helical gear 31 move leftward in the axial direction due to this thrust force applied leftward in the axial direction, the right tooth portions 22*b* and 31*b* that are out of contact with one another come into contact with each other through the performance of an aligning action for establishing a double-sided contact state. In this double-sided contact state, the thrust force applied leftward in the axial direction as a result of contact between the left tooth portions 22*a* and 31*a* and a thrust force applied rightward in the axial direction as a result of contact between the right tooth portions 22*b* and 31*b* counterbalance each other. Therefore, the thrust forces applied oppositely in the axial direction are balanced with each other at the meshing portion 3*a*. In this balanced state, the third double helical gear 22 and the fourth double helical gear 31 do not produce an axial behavior. That is, with the meshing portion 3*a* of the second gear pair 3 aligned, the third double helical gear 22 does not move in the axial direction on the second shaft 20, so the aligning action of the second double helical gear 21 can be restrained from being hindered by the third double helical gear 22.

Besides, the power transmission mechanism 1 is equipped with bearings 12 and 13 as first bearings that rotatably support the first shaft 10, bearings 23 and 24 as second bearings that rotatably support the second shaft 20, and bearings 32 and 33 as third bearings that rotatably support the third shaft 30. In order for a double helical gear to exert an aligning action, at least one of two parallel shafts needs to be supported by a bearing that does not bind a rotary shaft in an axial direction thereof, such as a cylindrical roller bearing. As shown in FIG. 1, the bearings 12 and 13 as the first bearings support the first double helical gear 11 and are attached to both sides of the first shaft 10 in the axial direction respectively. The left bearing 12 and the right bearing 13 are both configured as tapered roller bearings and can receive an axial load of the first shaft 10. Besides, the bearings 23 and 24 as the second bearings support the second double helical gear 21 and the third double helical gear 22 and are attached to both sides of the second shaft 20 in the axial direction respectively. The left bearing 23 and the right bearing 24 are both configured as cylindrical roller bearings. The cylindrical roller bearings do not receive any axial load. Therefore, through the support of the second shaft 20 by the bearings 23 and 24, the second shaft 20 is allowed to move in the axial direction when the second double helical gear 21 or the third double helical gear 22 exerts an aligning action. Furthermore, the bearings 32 and 33 as the third bearings support the fourth double helical gear 31 and are attached to both sides of the third shaft 30 in the axial direction respectively. The left bearing 32 and the right bearing 33 are both configured as cylindrical roller bearings. Though the support of the third shaft 30 by the bearings 32 and 33 configured as cylindrical roller bearings, the third shaft 30 is allowed to move in the axial direction when the fourth double helical gear 31 exerts an aligning action.

As described above, in the power transmission mechanism 1, the two double helical gears provided on the second shaft 20 are a combination of a double helical gear whose tooth portions are different in phase from each other and a double helical gear whose tooth portions are identical in phase to each other, so the aligning action of the second double helical gear 21 whose tooth portions are different in phase from each other can be restrained from being hindered by the axial behavior of the third double helical gear 22. Thus, a deterioration can be restrained from occurring in terms of vibrations and noise through the hindrance of the aligning action resulting from the mutual interference with the axial behaviors by the double helical gears on the same rotary shaft.

Incidentally, the disclosure is not limited to the above-mentioned embodiment thereof but can be appropriately changed within such a range as not to depart from the object thereof. For example, in the above-mentioned embodiment of the disclosure, the second shaft 20 including the two double helical gears (the second double helical gear 21 and the third double helical gear 22) has been described as the rotary shaft including the plurality of the double helical gears. However, the number of double helical gears provided on the same rotary shaft may not necessarily be two. In short, as regards a rotary shaft including two or more double helical gears, one or more of the double helical gears may each have right and left tooth portions that are offset in phase from each other, while one or more of the double helical gears may each have right and left portions that are identical in phase to each other.

Figure 2:
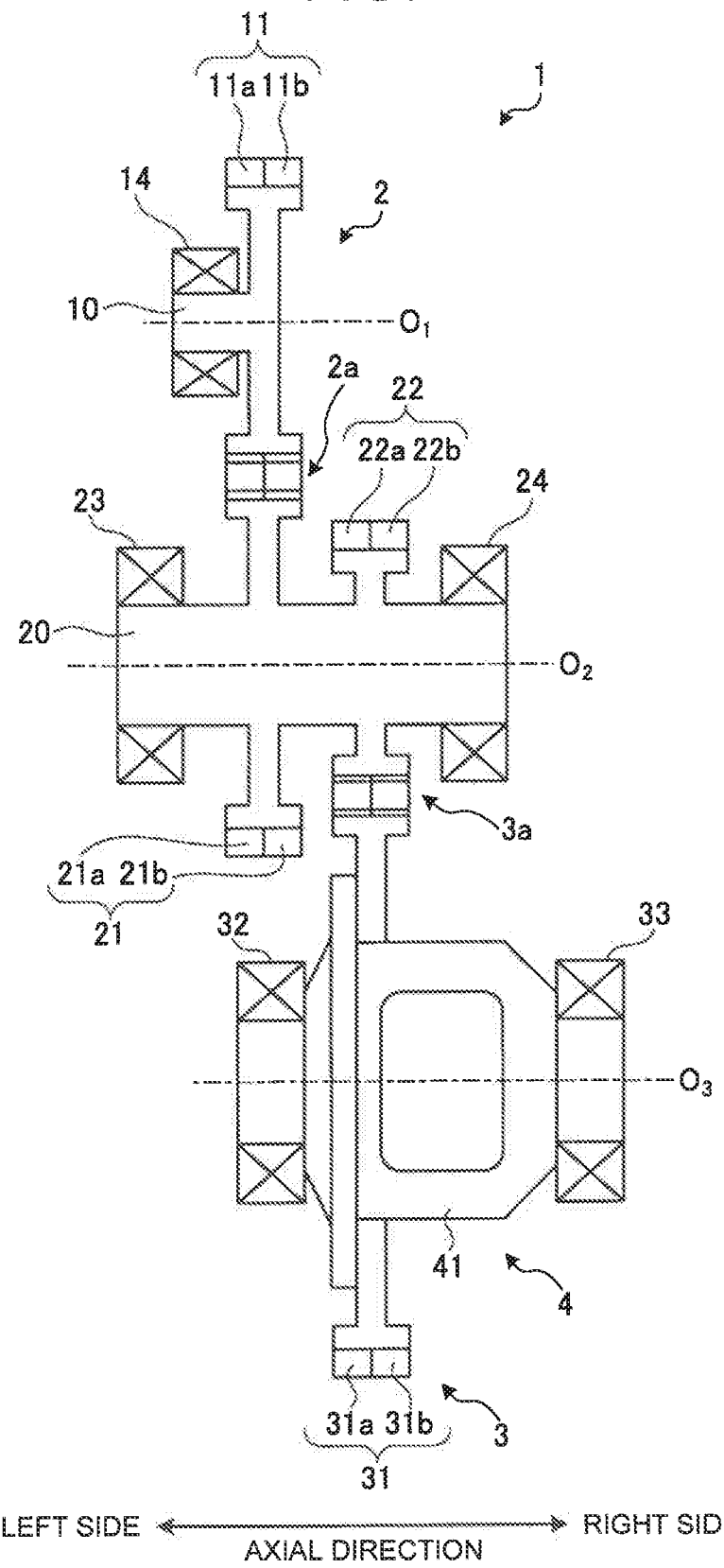
FIG. 2 is a view schematically showing an example of the power transmission mechanism that is mounted in a vehicle.

Besides, each of the first shaft 10, the second shaft 20 and the third shaft 30 may be a rotary member formed integrally with a double helical gear. That is, the above-mentioned rotary shaft (the gear shaft) encompasses a boss portion molded integrally with the double helical gear, a differential case of a differential mechanism that is mounted in a vehicle, and the like. For instance, FIG. 2 shows a configuration example in which the third shaft 30 is the differential case of the differential mechanism. FIG. 2 is a view schematically showing an example of the power transmission mechanism 1 mounted in the vehicle. The power transmission mechanism 1 shown in FIG. 2 is equipped with the first shaft 10 as an output shaft, the first double helical gear 11 as an output gear, the second double helical gear 21 as a counter driven gear that meshes with the output gear, the second shaft 20 as a countershaft, the third double helical gear 22 as a counter drive gear (a drive pinion gear) that meshes with a differential ring gear, the second gear pair 3 as a final gear pair, a differential case 41 as the above-mentioned third shaft 30, and the fourth double helical gear 31 as the differential ring gear. The fourth double helical gear 31 is integrated with the differential case 41. Besides, the bearings 33 and 32 as the third bearings are attached to right and left inboard portions of the differential case 41 respectively. As described hitherto, in the power transmission mechanism 1 that is mounted in the vehicle, part of the differential mechanism 4 may be constituted of the third shaft 30 and the fourth double helical gear 31. Incidentally, as shown in FIG. 2, the first shaft 10 may be supported in a cantilever manner by the single bearing 14.

Furthermore, in the case where the power transmission mechanism 1 is mounted in a vehicle, the disclosure is also applicable to an electric vehicle that employs a motor as a motive power source for running. For example, the motive power transmission mechanism 1 can be configured such that the first shaft 10 is an output shaft that rotates integrally with a rotor shaft of a motor, the second shaft 20 is a countershaft, and the third shaft 30 is a differential case. That is, the first shaft 10 may be a rotary shaft that rotates integrally with the motive power source for running, or a rotary shaft that rotates integrally with an output shaft of a transmission.

Besides, one of the first gear pair 2 and the second gear pair 3 may be structured such that the right and left tooth portions are offset in phase from each other (e.g., half offset in phase from each other), and the other gear pair may be structured such that the right and left tooth portions are identical in phase to each other. That is, the first gear pair 2 may be made up of double helical gears whose tooth portions are each identical in phase to each other, and the second gear pair 3 may be made up of double helical gears whose tooth portions are each different in phase from each other.

In addition, it is possible to select which one of the first gear pair 2 and the second gear pair 3 should be made up of double helical gears whose tooth portions are each identical in phase to each other, in consideration of the effectiveness of reducing the level of vibrations and noise. For example, this selection may be made focusing attention on the magnitude of a thrust force that is produced at the meshing portion, or on a frequency causing a problem.

First of all, from the standpoint of the magnitude of the thrust force, that one of the second double helical gear 21 and the third double helical gear 22 to which a larger thrust force is applied is preferred as the double helical gear whose tooth portions are identical in phase to each other. A larger thrust force is applied to the small-diameter double helical gear than to the large-diameter double helical gear. Therefore, in the case where the third double helical gear 22 is smaller in diameter than the second double helical gear 21 as described above, the third double helical gear 22 as the small-diameter gear has tooth portions that are identical in phase to each other, and the second double helical gear 21 as the large-diameter gear has tooth portions that are different in phase from each other. Thus, the level of vibrations and noise is more effectively reduced than in the case of the opposite combination (in the case where the third double helical gear 22 as the small-diameter gear has tooth portions that are different in phase from each other, and the second double helical gear 21 as the large-diameter gear has tooth portions that are identical in phase to each other).

Next, from the standpoint of the frequency, the characteristics of the gear pair made up of double helical gears whose tooth portions are each identical in phase to each other and the characteristics of the gear pair made up of double helical gear whose tooth portions are each different in phase from each other are taken into account. The gear pair made up of the double helical gears whose tooth portions are each different in phase from each other is characterized by generating a smaller meshing first-order component than the gear pair made up of the double helical gears whose tooth portions are each identical in phase to each other. Thus, the frequency that is produced in one of the gear pairs made up of the double helical gears whose tooth portions are each identical in phase to each other, and the frequency that is produced in the other gear pair made up of the double helical gears whose tooth portions are each identical in phase to each other are compared with each other. In this case, the gear pair that produces a frequency causing a problem in terms of vibrations and noise is preferably made up of double helical gears whose tooth portions are each different in phase from each other. That is, that one of the gear pairs which more greatly deteriorates in terms of vibrations and noise in the case where both the gear pairs are made up of double helical gears whose tooth portions are each identical in phase to each other is made up of double helical gears whose tooth portions are each different in phase from each other, and the other gear pair is made up of double helical gears whose tooth portions are each identical in phase to each other. Incidentally, when attention is focused on the meshing first-order component, the meshing first-order component produced in each of the gear pairs is estimated to be smaller in the case where both the gear pairs are made up of double helical gears whose tooth portions are each different in phase from each other than in the case where both the gear pairs are made up of double helical gears whose tooth portions are each identical in phase to each other. However, in addition to the fact that the double helical gears whose tooth portions are each different in phase from each other produce an axial behavior, the aligning actions are hindered by each other through the axial behavior of the double helical gears in the configuration in which the same rotary shaft has the plurality of the double helical gears as is the case with the second shaft 20. Therefore, it has been revealed from the knowledge of the inventors that a greater deterioration occurs in terms of vibrations and noise when both the gear pairs are made up of double helical gears whose tooth portions are each different in phase from each other than when both the gear pairs are made up of double helical gears whose tooth portions are each identical in phase to each other.

What is claimed is:

1. A power transmission mechanism comprising:
    a first shaft including a first double helical gear;
    a second shaft including a second double helical gear that meshes with the first double helical gear, and a third double helical gear that is arranged in alignment with the second double helical gear in an axial direction; and
    a third shaft including a fourth double helical gear that meshes with the third double helical gear, wherein:
        the second double helical gear includes a pair of tooth portions whose torsional directions are reverse to each other, and one of the tooth portions and the other tooth portion of the second double helical gear are offset in phase from each other,
        the third double helical gear includes a pair of tooth portions whose torsional directions are reverse to each other, and one of the tooth portions and the other tooth portion of the third double helical gear are identical in phase to each other,
        a diameter of the third double helical gear is smaller than a diameter of the second double helical gear, and
        an axial force which the third double helical gear produces is larger than an axial force which the second double helical gear produces.

2. The power transmission mechanism according to claim 1, wherein the one of the tooth portions of the second double helical gear is half offset in phase from the other tooth portion of the second double helical gear.

* * * * *